United States Patent
Kasztenny et al.

(10) Patent No.: US 7,693,607 B2
(45) Date of Patent: Apr. 6, 2010

(54) PROTECTION AND CONTROL SYSTEM FOR ELECTRIC POWER NETWORKS WITH SIGNAL AND COMMAND INTERFACES AT THE PRIMARY EQUIPMENT

(75) Inventors: Bogdan Z. Kasztenny, Markham (CA); Dale Finney, Oshawa (CA); Jeffrey Mazereeuw, Newmarket (CA); Ioan Marusca, Richmond Hill (CA)

(73) Assignee: General Electric Company, Schenectady, NY (US)

( * ) Notice: Subject to any disclaimer, the term of this patent is extended or adjusted under 35 U.S.C. 154(b) by 539 days.

(21) Appl. No.: 11/470,867

(22) Filed: Sep. 7, 2006

(65) Prior Publication Data

US 2008/0065270 A1 Mar. 13, 2008

(51) Int. Cl.
*H02J 13/00* (2006.01)
(52) U.S. Cl. ........................ 700/286; 700/292
(58) Field of Classification Search ............... 700/292, 700/2, 286; 398/109, 67, 113
See application file for complete search history.

(56) References Cited

U.S. PATENT DOCUMENTS

| | | | |
|---|---|---|---|
| 4,864,489 A * | 9/1989 | Yasuhara et al. | 700/2 |
| 5,258,652 A | 11/1993 | Nigawara et al. | |
| 7,027,896 B2 | 4/2006 | Thompson | |
| 2003/0200038 A1 | 10/2003 | Schweitzer et al. | |
| 2004/0019410 A1* | 1/2004 | Papallo et al. | 700/292 |
| 2005/0043861 A1* | 2/2005 | Thompson | 700/292 |

FOREIGN PATENT DOCUMENTS

| | | |
|---|---|---|
| EP | 1019997 | 7/2000 |
| EP | 1191662 A | 3/2002 |
| EP | 1416603 A | 5/2004 |
| EP | 1830450 A | 9/2007 |

OTHER PUBLICATIONS

European Search Report, Feb. 1, 2008, EP Application No. 07115372, European Patent Office in Munich.

* cited by examiner

*Primary Examiner*—Albert DeCady
*Assistant Examiner*—Steven R Garland
(74) *Attorney, Agent, or Firm*—GE Global Patent Operation; Jonathan E. Thomas; Roger C. Phillips

(57) ABSTRACT

A system for protection, control, metering, and monitoring of the delivery of electrical power is disclosed. Embodiments of the system provide input/output devices called bricks to receive analog and binary field data from primary equipment located in a power substation switchyard. The bricks are linked via fiber-optic patch cables and patch panels with one or more intelligent electronic devices ("IEDs"). In operation, the bricks convert the received binary and/or analog field data into digital signals, and transmit the digital signals synchronously to their associated IEDs using clock signals provided by each IED to the individual bricks. The bricks may accept a computer software code download from each of its master IED(s). Multiple code implementations, each tailored to the requirements of its master IED(s) can therefore co-exist on a single brick.

24 Claims, 4 Drawing Sheets

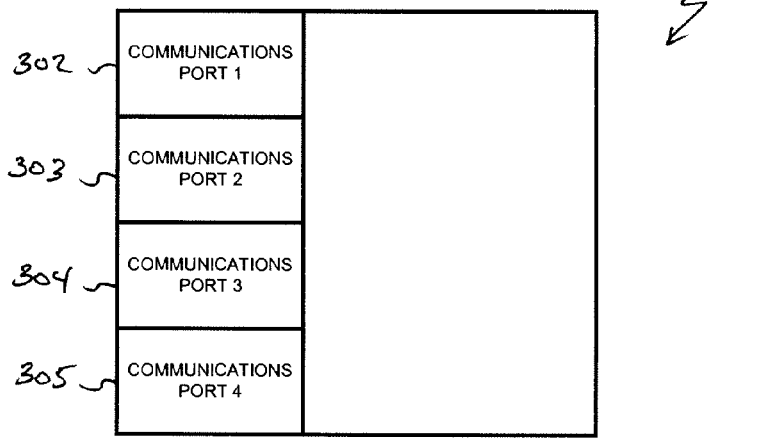
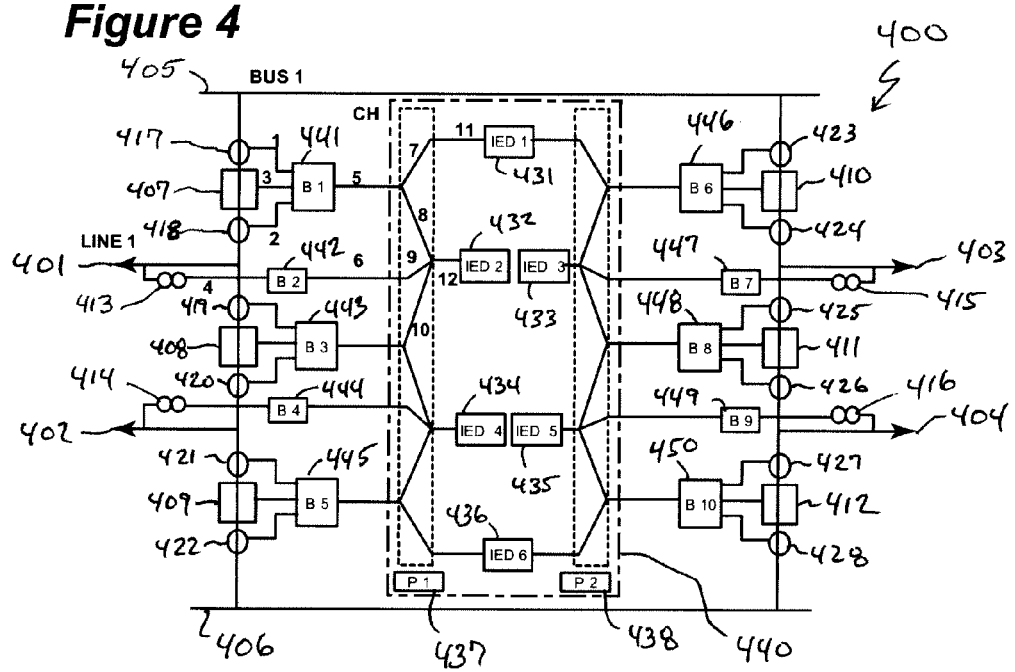

PROTECTION AND CONTROL SYSTEM FOR ELECTRIC POWER NETWORKS WITH SIGNAL AND COMMAND INTERFACES AT THE PRIMARY EQUIPMENT

BACKGROUND

1. Field of the Invention

The field of the invention generally relates to the commercial and industrial production of electrical power and, more particularly, to a system and method for protecting and controlling electric power networks.

2. Description of Related Art

A typical power distribution grid generally includes a power plant, a transmission substation, high voltage transmission lines, and a power substation. The power plant's spinning generator outputs three-phase alternating-current (AC) electrical power, which leaves the generator and enters the transmission substations. Transformers at the transmission substation substantially boost the generator voltage to a high voltage sufficient to transmit the electrical power over long distances via the high voltage transmission lines. Before the transmitted electrical power is used by homes or industry, it passes through a power substation.

A power substation generally includes transformers that step the generator voltages down to distribution voltages; one or more distribution "busses" that split the stepped-down distribution voltages off in multiple directions; and a variety of circuit breakers and disconnect switches that can be configured to disconnect the power substation (or a portion thereof) from the power grid or to disconnect one or more distribution lines from the power substation. In medium voltage to extra-high voltage substations, this primary equipment (e.g., the transformers, circuit breakers, disconnect switches, distribution busses, and the like, that are components of an electrical power substation) is located in an area of the power substation known as the switchyard.

A typical layout of a power substation separates the primary equipment described above from the protection and control equipment that interfaces with and manages it. Thus, while the primary equipment typically resides in the switchyard, the protection and control equipment typically resides in a separate control house.

Examples of protection and control equipment include microprocessor-based protective relays, meters, control switches, remote terminal units, human-machine-interface ("HMI") terminals, and the like—often referred to as Intelligent Electronic Devices (IEDs). An example of a conventional IED is the Model D25 Multifunction IED for Substation Control manufactured by the General Electric Company of Schenectady, N.Y. This unit monitors voltage difference, phase angle difference, and slip frequency. It also functions as a programmable logic controller, substation local area network node, and an IED gateway. Many IED's communicate using the Supervisory Control and Data Acquisition (SCADA) protocol.

In operation, IED's manage the substation's power output by monitoring data from sensors associated with the primary equipment. To maintain desired voltage levels, IED's are often configured to issue commands to one or more pieces of primary equipment if voltage, current, and/or frequency anomalies are detected. These commands may instruct one or more pieces of primary equipment to operate in a pre-determined manner (e.g., to trip a circuit breaker).

A disadvantage of separating conventional IEDs from their managed pieces of primary equipment is that miles of copper wiring are needed to interconnect the primary equipment with the conventional IEDs. Often, a medium-voltage to high voltage power substation has upwards of tens of thousands of terminations and millions of terminations, respectively, e.g., the connections made when the ends of control cables are attached to termination racks located at the control house. Another disadvantage is the significant cost associated with building or retrofitting such systems, due to the millions of wire terminations involved. The majority of this cost relates to the design, installation, testing, and documentation of the control wiring. International Electrotechnical Commission ("IEC") Standard 61850 (Communication Networks and Systems in Substations) is a proposed industry-wide basis for automation of power substations in an electric power delivery system. Preliminary approaches at implementing this standard and reducing the impact of copper wiring, however, fail to provide specific teachings or a solid, workable architecture. Such approaches, and the standard itself, leave numerous gaps yet to be filled in. A detailed discussion of the drawbacks associated with IEC 61850 specifically, and the disadvantages associated with prior approaches generally, is provided in a paper by B. Kasztenny, J. Whatley, E. Udren, J. Burger, D. Finney, M. Adamiak, entitled "Unanswered Questions about IEC 61850—What needs to happen to realize the vision?", Proceedings of the 32nd Annual Western Protective Relay Conference, Spokane, Wash., Oct. 25-27, 2005.

A solution is thus needed that provides a new power substation architecture, new protection and control equipment, and/or a new method of operating a power substation.

BRIEF DESCRIPTION OF THE INVENTION

The technology disclosed herein overcomes the disadvantages associated with the related art and meets the needs discussed above by providing a new power station architecture that, among other advantages: reduces or eliminates the need for the millions of copper wire terminations associated with conventional power substation architecture; significantly reduces the cost of building or retrofitting a power substation; eliminates use of extra devices to relay control data from IEDs to primary equipment; eliminates the external time synchronization of master and slave devices; and provides economical use of redundant field devices. Additionally, an embodiment of a method disclosed herein provides, among other advantages, internal, on-the-fly time synchronization for one or more pieces of primary equipment or control equipment.

In an embodiment, the new power substation architecture locates one or more new devices for interfacing one or more pieces of primary equipment to IEDs (hereinafter, these new devices are referred to as "bricks") in the switchyard. Each "brick" may be connected directly to the copper circuitry of a piece of primary equipment, and connected directly to a fiber-optic patch panel. The fiber-optic patch panel may be connected with one or more SCADA IED's located in the control house. The connections between each brick and piece of primary equipment are shorter, simpler, less variable, and less labor intensive compared with conventional methods of wiring a power substation. In an embodiment, each brick converts analog input signals: e.g., currents, voltages, and the like, into digital representations, and can execute commands generated by the protection and control system, such as, but not limited to, tripping and reclosing one or more circuit breakers.

In an embodiment where point-to-point, fiber-optic cables are used to connect each brick with one or more IEDs, the new power substation architecture does not use extra devices, such as Ethernet switches, to move data about. Additionally, such sharing reduces the total amount of (and costs of installing/maintaining) power substation protection and control equipment.

A technical effect afforded by an embodiment of the invention is the generation and output of a virtual synchronization signal used to synchronize each brick with its processing (master) IED (or IEDs).

An embodiment of the invention may provide a system for protection, control, and monitoring of delivery of electric power. The system may include an input/output interface device (hereinafter "brick") coupled with a piece of primary equipment and configured to receive field data from the piece of primary equipment. Additionally, an intelligent electronic device ("IED") may be coupled with the brick. The IED may be configured to receive the field data from the brick. A patch panel may be coupled with the brick and configured to route the field data to the IED. A first communication link may couple the brick and the patch panel. A second communication link may couple the patch panel and the IED.

Another embodiment of the invention may provide a method for operating a power substation. The method may include receiving at an input/output interface device (hereinafter, "brick") field data signals from one or more types of primary equipment. The method may further include sending the field data signals to one or more intelligent electronic devices ("IEDs"). The method may yet further include receiving at the brick binary commands derived from the field data signals. The method may further include operating outputs in accordance with the received binary commands.

BRIEF DESCRIPTION OF THE DRAWINGS

The above and other aspects of various embodiments of the claimed invention will become more apparent when the following detailed description is considered together with the accompanying drawings in which:

FIG. 3 is a block diagram illustrating an embodiment of an intelligent electronic device ("IED");

FIG. 4 is a schematic diagram of an embodiment of a protection and control system for a sample electric power network with signal and command interfaces at one or more pieces of control equipment;

DETAILED DESCRIPTION OF THE INVENTION

Reference is made herein to the accompanying drawings briefly described above, which show by way of illustration various embodiments of the claimed invention. Persons of ordinary skill in the above-referenced technological field will recognize that other embodiments may be utilized, and that structural, electrical, and procedural changes may be made without departing from the scope of the claimed invention. As used herein, the singular (illustratively, "brick") includes the plural (illustratively, "bricks"), and the plural includes the singular.

Figure 1:
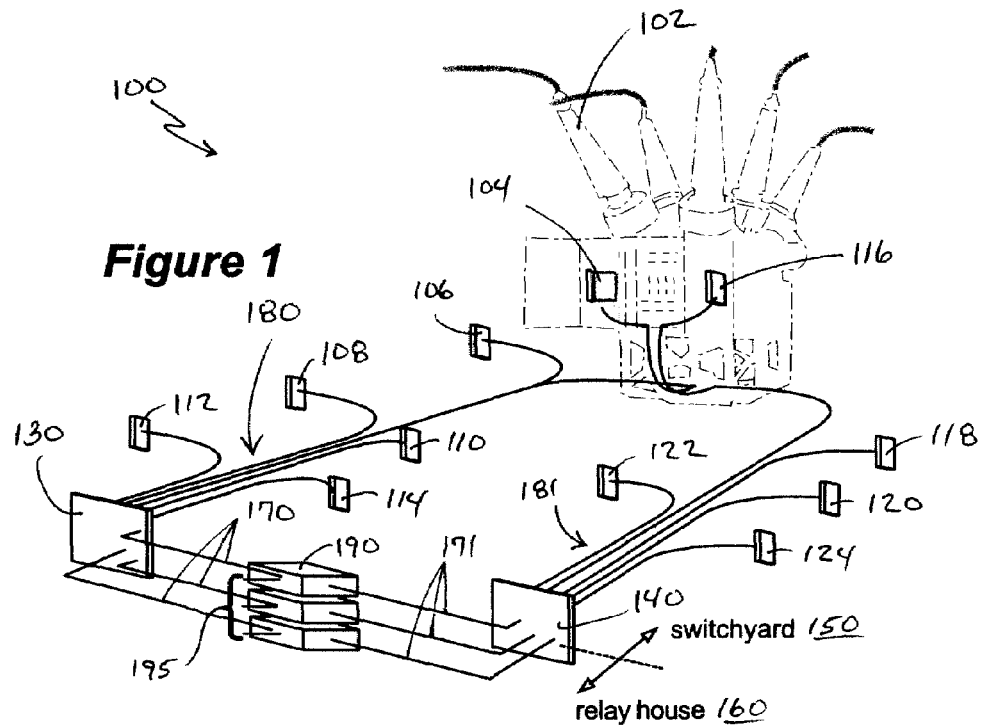
FIG. 1 is a schematic diagram of a power substation architecture configured according to an embodiment of the invention.

FIG. 1 is a schematic diagram of a power substation architecture 100 configured according to an embodiment of the invention. Referring to FIG. 1, two fiber-optic patch panels 130 and 140 are disposed between a switchyard 150 and a relay control house 160. The switchyard 150 comprises one or more pieces of primary equipment, such as, but not limited to, the high voltage apparatus 102. Each piece of primary equipment may be directly connected to at least one new device (called a "brick") for interfacing the primary equipment to one or more IEDs. In FIG. 1, for example, two bricks 104 and 116 are connected to the high voltage apparatus 102. Brick 104, together with bricks 106, 108, 110, 112, and 114, is point-to-point connected to the fiber-optic patch panel 130 via outdoor fiber-optic patch cables 180. Similarly, brick 116, together with bricks 118, 120, 122, and 124, is connected to the fiber-optic patch panel 140 via outdoor fiber-optic patch cables 181. The bricks may be powered using a pair of copper wires embedded in a fiber-optic patch cable. In FIG. 1, the pieces of primary equipment associated with each of bricks 106, 108, 110, 112, 114, 118, 120, 122, and 124, are not shown, so as not to overcomplicate the drawing. Consequently, it is understood that an embodiment of the invention may comprise other types of primary equipment other than high voltage apparatus 102.

In an embodiment, the fiber-optic patch panel 130 is connected to processing units 190 via interior fiber-optic patch cables 170. Similarly, the fiber-optic patch panel 140 is connected to the processing units (e.g., "IEDs") 190 via interior fiber-optic patch cables 171. The IEDs 190 are each connected, via communications links 195, to higher-level protection and control equipment, such as, but not limited to a computer database, a human-interface terminal, and the like. Each type of higher-level protection and control equipment may be configured to communicate using the SCADA protocol described above.

Each of the IEDs 190 (and/or each type of higher-level protection and control equipment) may include a computer processor and a data bus linking the computer processor with at least a memory, and a communication port. As each of the IEDs 190 (and/or each type of higher-level protection and control equipment) operates machine-executable code stored in the memory may be accessed and processed by the computer processor so that a first signal (or first data) input to each of the IEDs 190 (and/or each type of higher-level protection and control equipment) is output as a second signal (or second data) that may be used by other components of the power substation architecture to maintain a desired voltage level for a power substation (or a component thereof).

Referring again to FIG. 1, a successful architecture 100 for deploying fiber-based protection and control schemes must meet strict reliability criteria required for a given power system. As further explained below with reference to FIGS. 2, 4, 6, and 7, embodiments of the invention accomplish this by providing redundancy and by keeping the total number of system components low. Embodiments of the invention provide redundancy using a low number of system components by using bricks and configuring the bricks to serve multiple IEDs. This contrasts with the conventional methodology of using one or more input/output subsystems per IED. It further contrasts with the conventional methodology of using an Ethernet switch to share data among IEDs, which configuration reduces reliability and generates configuration, security, data traffic, and other problems. In contrast, embodiments of the invention provide field data to all IEDs via direct pointto-point radial, multi-fiber connections, utilizing pre-fabricated multi-fiber, patch cables having pre-terminated, high-density connections. Thus, as shown in FIG. 1 and further described below, each IED may be served independently from a brick.

Figure 2:
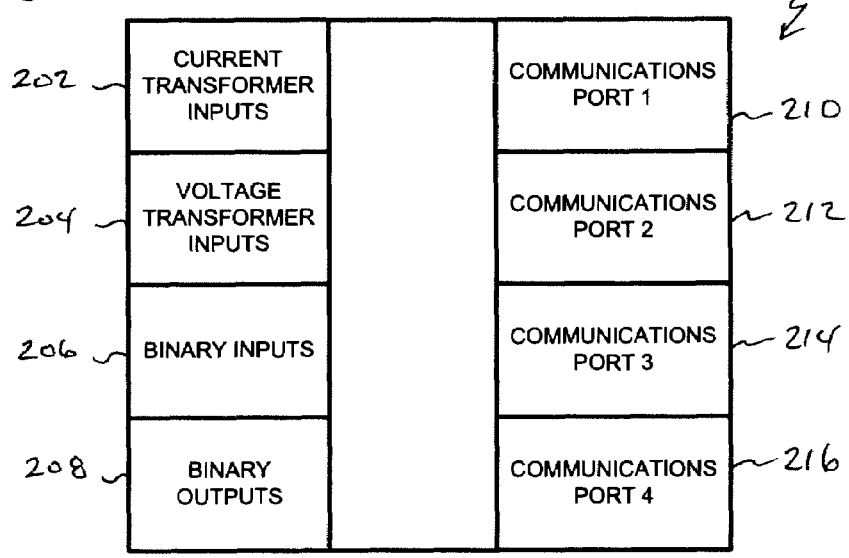
FIG. 2 is a block diagram illustrating an embodiment of a brick.

FIG. 2 is a block diagram of an embodiment of a brick 200. Referring to FIG. 2 the brick 200 includes a plurality of inputs 202, 204, and 206, to receive analog and binary signals from the primary equipment. These include current signals 202 from current transformers or equivalent instruments such as low-energy electronic transformers, voltage signals 204 from voltage transformers or equivalent instruments such as low-energy electronic transformers, and signals 206 indicating events such as, but not limited to, circuit breaker position (open or closed), low gas pressure, spring charge failure, and the like. The brick 200 also includes a plurality of outputs 208 to send binary commands to its associated primary equipment. Non-limiting examples of such commands include a "Trip" command and a "Reclose" command. The "Trip" command causes a circuit breaker, for instance, to shut off a particular circuit if voltage, current, or other anomaly is detected. The "Reclose" command causes the circuit breaker to turn on a circuit that was previously turned off. The brick 200 includes a plurality of fiber-optic communications ports 210, 212, 214, 216 that may be integrated into a single high-density connector (not shown). This connector may be configured to receive a multi-fiber optical cable configured to provide an independent communications path with one or more IEDs.

FIG. 3 is a block diagram of an embodiment of a protection and control IED 300. Referring to FIG. 3, the protection and control (IED) 300 includes a plurality of fiber-optic communications ports 302, 303, 304, and 305 that may also be integrated into a single high-density connector (not shown). This connector may be configured to receive a multi-fiber optical cable configured to provide an independent communications path with multiple bricks. The IED 300 may be powered exclusively, or redundantly, using a pair of copper wires embedded in a fiber-optic patch cable.

FIG. 4 is a schematic diagram of an embodiment of another substation architecture 400. Referring to FIG. 4, an exemplary embodiment of an electric power substation architecture 400 is depicted with four transmission lines 401, 402, 403, and 404; two busses 405,406; and six circuit breakers 407, 408, 409, 410, 411, and 412. Each transmission line 401, 402, 403, and 404 includes one voltage transformer 413, 414, 415, and 416, respectively. Each circuit breaker 407, 408, 409, 410, 411, and 412 includes two current transformers. For example, circuit breaker 407 includes current transformers 417,418. Circuit breaker 408 includes current transformers 419,420. Circuit breaker 409 includes current transformers 421,422. Circuit breaker 410 includes current transformers 423,424. Circuit breaker 411 includes current transformers 425,426. Circuit breaker 412 includes current transformers 427,428.

The substation architecture 400 further includes six protection and control IEDs 431, 432, 433, 434, 435, 436, and two patch panels 437,438 located inside the control house 440. The substation architecture 400 also includes ten interface devices (e.g., "bricks") 441, 442, 443, 444, 445, 446, 447, 448, 449, and 450 located adjacent to predetermined pieces of primary equipment. The substation architecture 400 further includes multiple communication links (illustratively, but not limited to, communication links 1, 2, 3, 4, 5, 6, 7, 8, 9, and 10) coupling together the above-referenced bricks, patch panels, and IEDs. In an embodiment, a multi-fiber optical cable (or one or more elements thereof) may be used to form the communication links. In each patch panel 437,438, a separate physical access may be provided for the part of the patch panel interfacing with the high density fiber cables linking the IEDs and the bricks, and a separate physical access may be provided for the part that cross-connects the fiber pairs between the IEDs and the bricks.

Each brick may receive (and/or digitize) at least one of analog signals, binary signals, and a combination thereof. Non-limiting examples of analog signals include alternating voltages and currents supplied by transformers, low-energy analog signals supplied by instrument transformers, and analog outputs from temperature, and pressure, motion, and other sensors, among others. Non-limiting examples of binary signals include circuit breaker position, disconnect and grounding switch position, and alarm or status indication from other sensors and devices, among others.

As shown in FIG. 4, the IED 432 receives digitized current signals and binary signals from Brick 441 and Brick 443, and receives digitized voltage signals from brick 442. The IED 432 also sends digitized command signals to Brick 441 and Brick 442. The IED 432 may include multiple independent communication ports. Thus, data transfer between IED 422 and the brick 441 may occur via a first independent communication port, and data transfer between the IED 432 and the brick 442 may occur via a second independent communication port.

In an embodiment, the multiple communication ports of the IED 432 may be connected to the fiber-optic patch panel 437 through a single multi-fiber communication link 12. The communication link 12 may terminate at the fiber-optic patch panel 437 using a plurality of pre-terminated fiber-pair connectors. Within the multi-fiber communication link 12, a single pair of fibers may be dedicated for communication with each brick that require communication with IED 432. In this exemplary embodiment, communications with three bricks (441, 442, 443) is required. Thus, a first pair of fibers of the multi-fiber communication link 12 is dedicated for communication with brick 441, a second pair of fibers is dedicated for communication with brick 442, and a third pair of fibers is dedicated for communication with brick 443.

Figure 5:
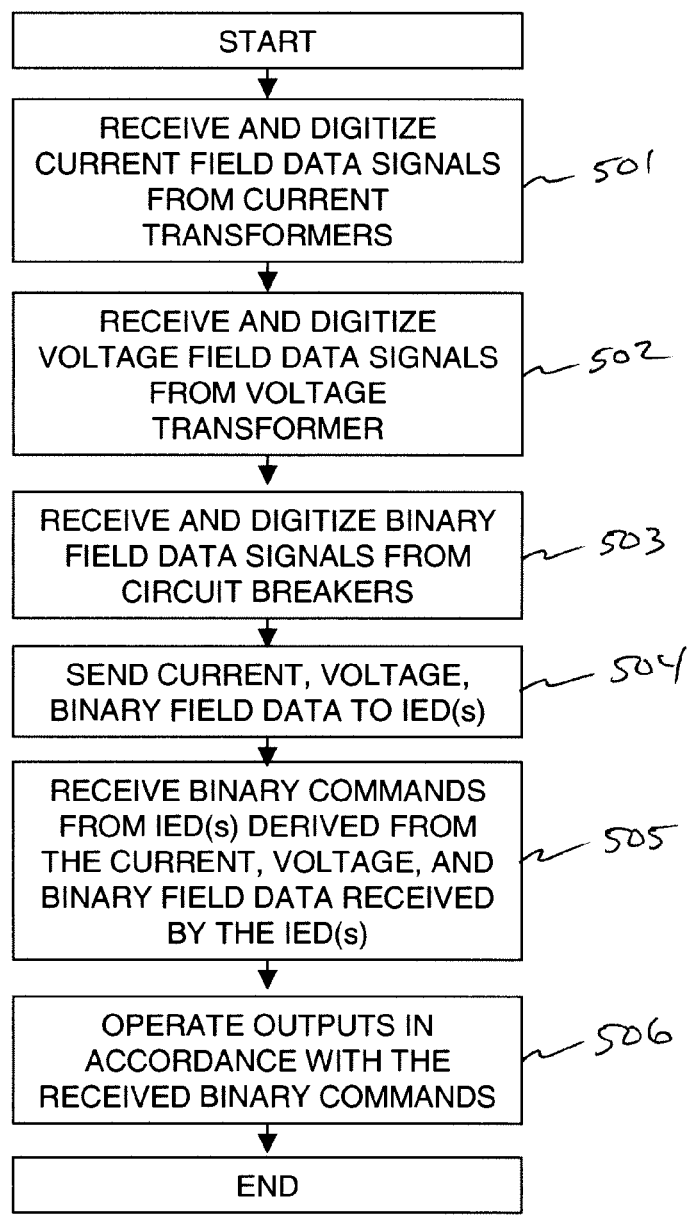
FIG. 5 is a flowchart illustrating an embodiment of a method of operating a power substation.

FIG. 5 is a flowchart illustrating an embodiment of a method 500 of operating a power substation. The steps of method 500 may be performed in any suitable order, and variants of the method 500 may include one or more steps in addition to the ones shown in FIG. 5 and described herein.

Referring to FIG. 5, the method 500 may begin at step 501, when a brick receives and digitizes current signals from one or more current transformers. At step 502, the same or different brick may also receive and digitize voltage signals from one or more voltage transformers. At step 503, the same or different brick may receive and digitize binary signals from one or more binary inputs from a circuit breaker, or other type of primary equipment. At step 504 the brick (or bricks) sends the received and digitized current, voltage, and binary signal data to one or more IEDs. At step 505, the brick (or bricks) receive binary commands from the IEDs. At step 505, the brick (or bricks) receive binary commands from the IEDs. The IEDs may derive these binary commands from the digitized current, voltage, and binary signal data previously received from the brick (or bricks). At step 506, the brick (or bricks) operate outputs (e.g., cause actions to be performed) in accordance with the received binary commands. Thereafter, the method 500 may end.

In an embodiment, the step 506 of operating outputs may include issuing command signals that include: open/close commands for circuit breakers and disconnect switches; lower/rise commands for transformer tap changers; and other commands suitable for operating power substation primary equipment. The command signals may be transmitted to the primary equipment via solid-state switches that interface with the direct current ("DC") control circuitry of the primary equipment.

Figure 6:
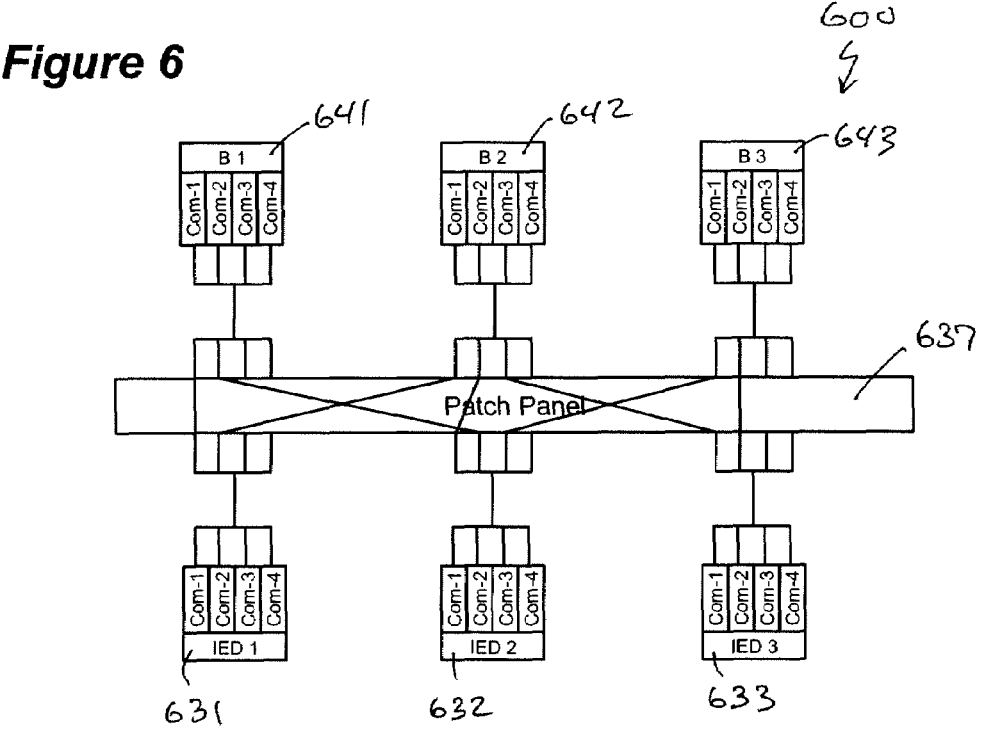
FIG. 6 is a schematic diagram illustrating an embodiment of communications routing among three bricks and three IEDs.

FIG. 6 is a block diagram illustrating an embodiment of communication path routing 600 among three IEDs 631, 632, 633, a fiber-optic patch panel 637, and three bricks 641, 642, 643. Referring to FIG. 6, each IED 631, 632, 633 and each brick 641, 642, 643 has four independent communications ports Com-1, Com-2, Com-3, and Com-4. On each brick, a port is dedicated for communications with a single IED. On each IED, a port is dedicated for communication with a single brick. The connection between each device (e.g., each brick and each IED) and the patch panel 637 has a dedicated fiber pair for each IED-Brick association. For example, IED 631 is linked with bricks 641 and 642. Thus, the communication port Com-1 of IED 631 is linked with the communication port Com-1 of brick 641, and communication port Com-2 of IED 631 is linked with the communication port Com-1 of brick 642. Additionally, IED 632 is linked with each of bricks 641, 642, and 643. Thus, communication port Com-1 of IED 632 is linked with the communication port Com-2 of brick 642. The communication port Com-2 of IED 632 is linked with the communication port Com-2 of brick 641. The communication port Com-3 of IED 632 is linked with the communication port Com-1 of brick 643. Additionally, IED 633 is linked with each of bricks 642 and 643. Thus, the communication port Com-1 of IED 633 is linked with the communication port Com-3 of brick 642. The communication port Com-2 of IED 633 is linked with the communication port Com-2 of the brick 643. It is understood that many other configurations of connections between the IEDs 631, 632, 633, and the bricks 641, 642, 643 are possible within the scope of the claimed invention.

Referring again to FIGS. 4 and 6, each brick receives a clock signal from each of the IEDs it serves. Thus, a brick serving multiple IEDs will therefore receive multiple clock signals. Examples of this are the brick 441 in FIG. 4, which serves IEDs 431, 432, and the brick 642 in FIG. 6, which serves IEDs 631, 633. In an embodiment, each IED independently generates its own clock signal, and each brick linked to an IED synchronizes the data transfer using the clock signal generated by that same IED. In contrast to external clock methods used to synchronize conventional IEDs, there is no requirement in an embodiment of the invention for data synchronization between individual IEDs. Instead, data synchronization is independently carried out in each brick using the clock signal(s) received from its master IED(s), and each IED receives synchronized data from all of its bricks. Thus, in an embodiment, each brick transmits/receives data to/from the IEDs asynchronously, and uses a phase lock loop on each direct 1:1 communication connection with the IEDs.

The phase lock loop establishes a virtual synchronous sample and hold signal for each of the served IEDs, and then re-samples the data to obtain versions of the data that are synchronous with each of the served IEDs. This feature improves system reliability by eliminating a single external clock (e.g., a single point of failure) and lowers the cost of synchronizing each data transfer (e.g., no need to distribute an external clock signal to all bricks simultaneously). In one embodiment, the IEDs may be equipped with a timing input signal, such as a IRIG-B input signal, and may decode this signal to synchronize their clocks with the absolute time reference in the substation or across substations, such as when using Global Positioning System clocks. IRIG-B is a standard format for encoding and distributing a time signal from a master clock to one or more receiving devices; it stands for Inter Range Instrumentation Group mod B—a standard originally created by the U.S. military and now used by private industry. In an embodiment, each IED is configured to communicate date and time information to one or more associated bricks to provide for accurate time stamping of the brick's (or bricks') digital field data.

Figure 7:
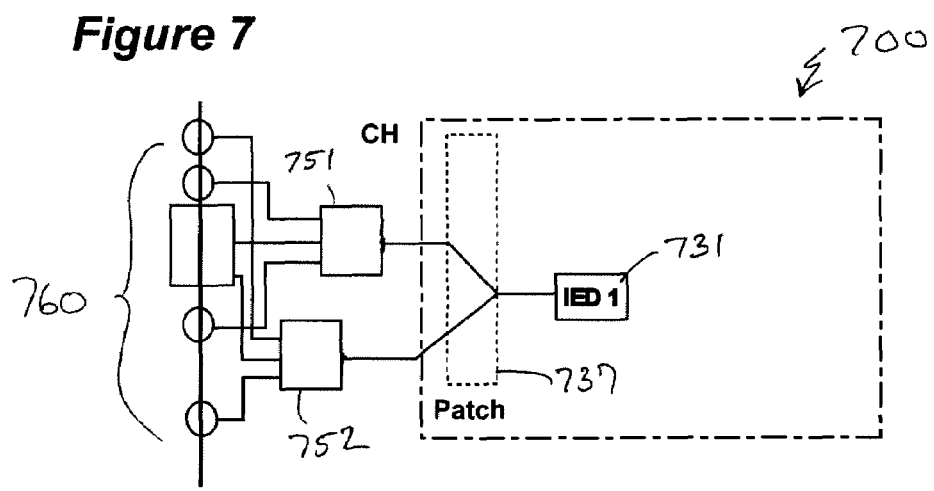
FIG. 7 is a schematic diagram illustrating an embodiment of power substation architecture having redundant bricks for one or more IEDs.

FIG. 7 is a schematic diagram illustrating an embodiment of power substation architecture 700 having redundant bricks 751, 752 for one or more IEDs 731. Referring to FIG. 7, two bricks 751, 752 may be connected to the primary equipment 760 to provide redundant signal measurement and control. The primary equipment 760 may include a circuit breaker, a current transformer, a voltage transformer, and the like. In the redundant system of FIG. 7, each of bricks 751, 752 receives and digitizes at least one of current, voltage, and binary signals from primary equipment 760, and synchronously transfers the digitized signals to the IED 731. The IED 731 compares the digitized signals received from each of the bricks 751, 752 to ensure integrity of data and to guard against a failure of either brick 751 or 752. The IED may be configured to apply extra checks to identify an intact set of digital field data upon detecting an inconsistency between a first digital field data received from the brick 751 and second digital field data received from the second brick 752. The IED may be further configured to switchover permanently to the intact set of digital field data and to continue to operate despite a failure of the brick 751 or the second brick 752.

Thus, in an embodiment, two copies of data obtained from monitored primary equipment are transmitted to each IED. This increases reliability beyond conventional protection and control systems, but still keeps the total number of parts in the system low by allowing multiple IEDs to share the data. For example, an average of three conventional IEDs would be needed to monitor a given piece of primary equipment in a power substation switchyard. This means that three input/output subsystems would be needed to process the signals delivered to the control house via copper wires. Yet, none of these subsystems would be redundant. In contrast, an embodiment of the invention provides the input/output interface using only two redundant bricks, which are placed in the switchyard for a given piece of primary equipment. Because these two bricks can serve three IED masters, each IED no longer needs a separate I/O subsystem. Thus, an embodiment of the invention reduces the total number of parts for the input/output subsystems by ⅔ while adding full redundancy to the overall system.

Embodiments of the invention preserve conventional approaches to the engineering of electrical power protection and control systems. In particular, these embodiments preserve the concept of protection zones. Thus, in an embodiment, one IED (master) may be deployed to protect a single zone in the primary equipment (e.g., transmission line, transformer, capacitor bank, busbar, etc.). Using the bricks described above permits this to occur despite differences in the way that field signals are generated (e.g., current, voltage, binary, and the like).

In an embodiment of a power system where multiple computer software applications are distributed over multiple protection and control devices (e.g., IEDS and bricks) precise interoperation among all of these devices is paramount. Embodiments of the invention provide interoperability in the following way: A brick need not have an independent firmware. Instead, it may accept a computer software code download from each of its master IED(s). Multiple code implementations, each tailored to the requirements of its master IED(s) can therefore co-exist on a single brick. This mitigates interoperability concerns associated with multiple firmware versions and therefore removes the need for testing. Thus, in an embodiment, the bricks may be entirely maintained by their associated IED(s) in terms of updating their operating code and other parameters as necessary without the need for a human operator of the power substation to interact with the bricks as separate devices. In another embodiment, upon establishing communication between a given brick and the IED, the IED may validate and update, if necessary, the computer software code that controls functionality of only the given brick.

In an embodiment, one or more bricks may be mounted directly to a piece of primary equipment or in a vicinity of the piece of primary equipment.

In an embodiment, during commissioning of a power substation or equivalent activity, a user may lock the system comprised of bricks and IED(s) by acknowledging a given configuration of physical devices is valid and should be stored in a computer memory and considered normal for subsequent operation of the system. The valid configuration of bricks and IED(s) may be represented by a unique identifier such as a serial number, or a by similar method.

In an embodiment, upon establishing communication between a given brick and an IED, the IED may check for a unique identification designation of the brick, and may alters the IED's functionality based on the positive or negative result of the check, for example by issuing an alarm, inhibiting some functions, or automatically switching to a test mode. A function generates outputs through the evaluation or processing of inputs. When a function is inhibited, the outputs are forced to a predetermined default state.

In an embodiment, association between the brick and the IED comprises physical connections as compared to an addressing or equivalent scheme. Additionally, two or more IEDs may use a shared brick to facilitate communication between them. In such an embodiment, a sending IED may include a data item of interest in a packet destined for the shared brick. The brick may copy the received data item of interest in its outgoing packages to some or all the other connected IEDs.

In an embodiment, some or all copper-based signals provided to the bricks may be provided by rugged multi-pin connectors. In another embodiment, a shorting cap may be provided to short out alternating current signals at the IED connectors to allow continuous operation of the power system with a brick being removed, which otherwise would leave the current signal path open.

The bricks may be installed and pre-tested off-site by the manufacturer of the power system apparatus or a refurbishment shop before delivering the power system apparatus to an installation site. In an embodiment where a control house is pre-fabricated, the IEDs and fiber patch panels may be mounted in the control house and pre-tested prior to the delivery of the control house to an installation site. Embodiments of the invention are not limited to using fiber media. Rather, the fiber media described above may be replaced by electrical or wireless media.

A detailed description of various embodiments of the invention has been provided; however, modifications within the scope of the invention will be apparent to persons having ordinary skill in the above-referenced technological field. Such persons will appreciate that features described with respect to one embodiment may be applied to other embodiments. Thus, the scope of the invention is to be properly construed with reference to the following claims.

What is claimed is:

1. A system for protection, control, and monitoring of delivery of electric power energy, said system comprising:
   an input/output interface device comprising a first brick coupled with a piece of primary equipment and configured to receive field data from the piece of primary equipment;
   a second brick redundantly coupled with the piece of primary equipment and configured to receive the field data from the piece of primary equipment;
   at least one intelligent electronic device ("IED") configured to receive field data from the first brick and the second brick;
   a patch panel coupled with the first brick and the second brick and each of the at least one IED, the patch panel being configured to route the field data from the first brick and the second brick to selected ones of the at least one IED;
   a first communication link independently coupling each of the first brick and the second brick to the patch panel; and
   a second communication link independently coupling the patch panel to each of the at least one IED, wherein the first brick and the second brick are configured to transmit said field data to the selected ones of the at least one IED and to synchronize the transmission of the field data to a sampling clock signal of each of the selected ones of said at least one IED, wherein each of the at least one IED is configured to independently establish a phase lock loop across each communication link with associated ones of the first brick and second brick to provide the sampling clock signal to the first brick and the second brick.

2. The system of claim 1, wherein each of the first and second communications links is a patch cable having at least one pre-terminated high density connector on an end thereof.

3. The system of claim 2, wherein the first and second communication links are selected from the group consisting of: a fiber-optic media, an electrical media and a wireless media.

4. The system of claim 1, wherein the patch panel is located in a control house of a power substation.

5. The system of claim 1, wherein the first brick has no firmware and is configured to accept a computer software code download from at least one of the at least one IEDs.

6. The system of claim 1, wherein the field data received by the first brick includes at least one of analog signals, binary signals, and a combination thereof.

7. The system of claim 6, wherein the analog signals comprise at least one of alternating voltages and currents supplied by transformers, low-energy analog signals supplied by instrument transformers, and analog outputs from temperature, pressure, motion, and other sensors.

8. The system of claim 6, wherein the binary signals comprise at least one of circuit breaker position, disconnect and grounding switch position, and alarm or status indication from other sensors and devices.

9. The system of claim 1, wherein the first brick is further configured to receive a command signal from at least one of the at least one IEDs.

10. The system of claim 9, wherein the command signal comprises at least one of open/close commands for circuit breakers, disconnect switches, and lower/rise commands for transformer tap changers.

11. The system of claim 1, wherein the first brick is further configured to convert a digitized command signal received from at least one of the at least one IEDs into a binary command signal, and to transmit the binary command signal to the piece of primary equipment.

12. The system of claim 1, wherein the first brick is configured to convert one of a received analog field data signal and a binary field data signal into a digital field data signal, and to transmit the digital field data signal to at least one of the at least one IEDs.

13. The system of claim 12, wherein the first brick is configured to use an independent sampling clock when receiving its input field data via sampling and converting from at least one of analog field data signals and binary field data signals to digital signals.

14. The system of claim 1, wherein each of the first brick and the at least one IED has one or more independent communication ports, and wherein the first brick has a communication port dedicated to communicating with a communication port of a corresponding one of the at least one IEDs.

15. The system of claim 1, wherein each of the IEDs is configured to validate, and update if necessary, a computer software code that controls functionality of the first brick upon establishing a communication with the first brick.

16. The system of claim 1, wherein the system is configured to be locked upon receipt of an acknowledgment that a given configuration of the first brick and IED is valid, should be stored in a computer memory, and considered normal for subsequent operation of the system.

17. The system of claim 16, wherein the valid given configuration is represented by a unique identifier.

18. The system of claim 1, wherein the at least one IED is configured to compare first digital field data received from the first brick with second digital data received from the second brick to ensure integrity of the first and second digital field data.

19. The system of claim 18, wherein the at least one IED is configured to apply extra checks to identify an intact set of digital field data upon detecting an inconsistency between the first and second digital field data.

20. The system of claim 19, wherein the at least one IED is further configured to switchover permanently to the intact set of digital field data and further configured to continue to operate despite a failure of the first brick or the second brick.

21. The system of claim 1, wherein all communication between the first brick and selected ones of the at least one IED and the second brick and selected ones of the at least one IED is accomplished by direct point-to-point, multi-fiber connections without the need for an actively-switched network.

22. The system of claim 1, wherein in said patch panel a separate physical access is provided for a part of the patch panel interfacing with the first communication link, and a separate physical access is provided for a part that cross-connects fiber pairs between the first brick and the selected ones of the at least one IED.

23. The system of claim 1, wherein each of the at least one IEDs further comprises a rugged multi-pin connector.

24. The system of claim 23, further comprising a shorting cap configured to short out alternate current signals at the rugged multi-pin connector to allow continuous operation of the system with a brick removed.

* * * * *